(12) United States Patent
Teng

(10) Patent No.: US 11,029,973 B1
(45) Date of Patent: Jun. 8, 2021

(54) LOGIC FOR CONFIGURING PROCESSORS IN A SERVER COMPUTER

(71) Applicant: Amazon Technologies, Inc., Seattle, WA (US)

(72) Inventor: Shuwei Teng, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 175 days.

(21) Appl. No.: 16/362,244

(22) Filed: Mar. 22, 2019

(51) Int. Cl.
| | |
|---|---|
| *G06F 11/00* | (2006.01) |
| *G06F 9/445* | (2018.01) |
| *G06F 11/20* | (2006.01) |
| *G06F 9/4401* | (2018.01) |

(52) U.S. Cl.
CPC ........ *G06F 9/44505* (2013.01); *G06F 9/4405* (2013.01); *G06F 11/2017* (2013.01); *G06F 2201/805* (2013.01)

(58) Field of Classification Search
CPC .......................... G06F 9/44505; G06F 9/4405
See application file for complete search history.

(56) References Cited

U.S. PATENT DOCUMENTS

| | | | | |
|---|---|---|---|---|
| 6,725,317 B1* | 4/2004 | Bouchier | .............. | G06F 15/177 709/220 |
| 7,949,687 B1* | 5/2011 | Sinclair | .................. | G06F 16/22 707/803 |
| 2004/0216101 A1* | 10/2004 | Burky | ..................... | G06F 9/485 718/100 |
| 2015/0363422 A1* | 12/2015 | Shibayama | ........... | G06F 3/0632 707/827 |

* cited by examiner

*Primary Examiner* — Katherine Lin
(74) *Attorney, Agent, or Firm* — Klarquist Sparkman, LLP

(57) ABSTRACT

A server computer can have multiple potential configurations depending on a state of an input signal. In a first potential configuration, a single-platform model is used with multiple processors booted using a single BIOS. The multiple processors can have a bus there between allowing processor-to-processor communication. In a second potential configuration, a multi-platform model is used with multiple processors booted using separate BIOS. In this configuration, the bus between the processors is disabled so that the platforms operate autonomously. The hardware can be extended to support additional processors, such as 4, 8, etc. A failover mode also allows the hardware to detect a hardware error (e.g., bus error) and dynamically reconfigure the processors to use an alternative bus. With the failover, the addressing of the processors can be modified to reconfigure the server computer to compensate for the hardware error.

19 Claims, 10 Drawing Sheets

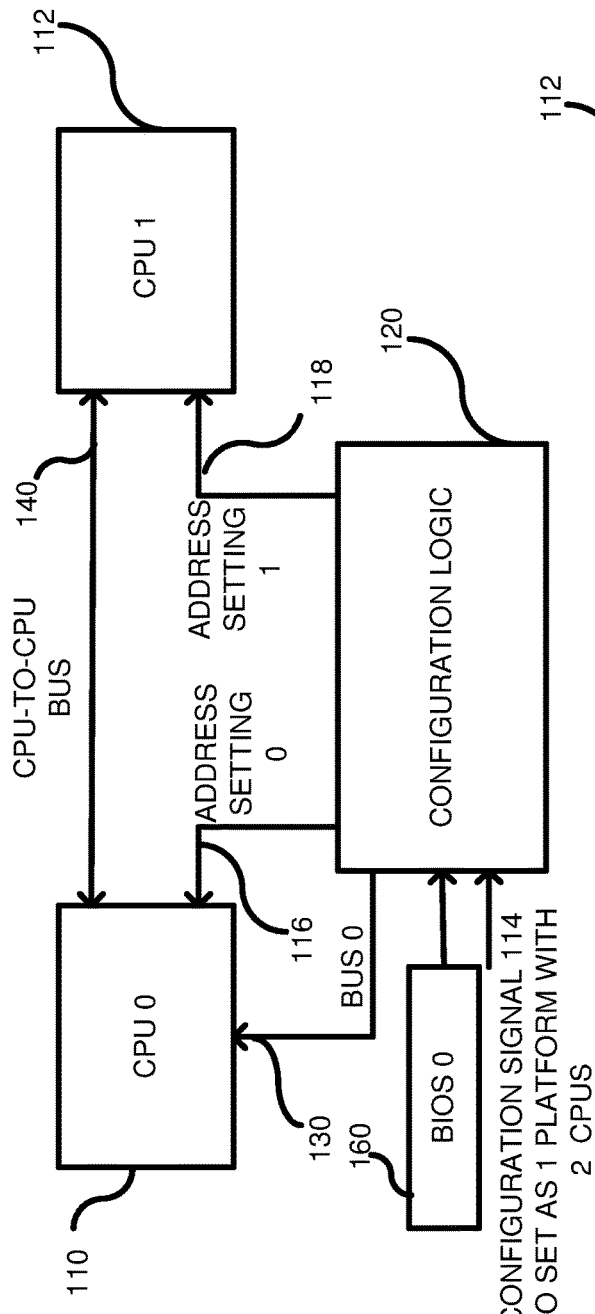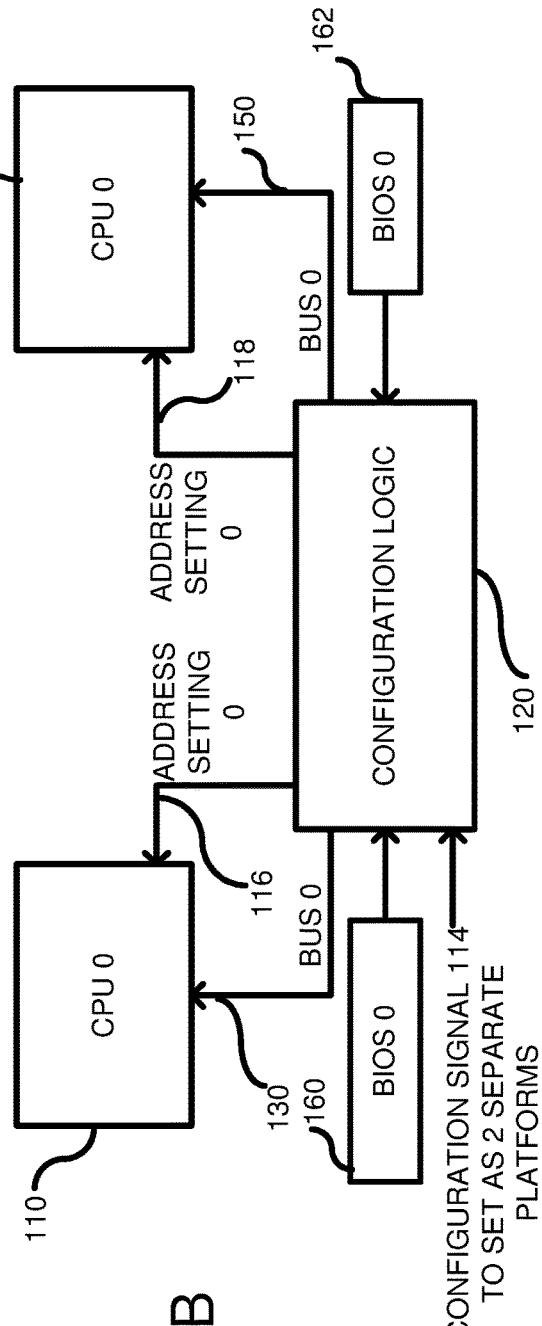

LOGIC FOR CONFIGURING PROCESSORS IN A SERVER COMPUTER

BACKGROUND

Server computers, including those operating in a data-center environment, can include multiple processors. Configuration of the processors is typically limited to the design provided by the processor's manufacturer. Modification of existing platforms is needed to provide more flexibility in terms of server computer configuration.

BRIEF DESCRIPTION OF THE DRAWINGS

FIG. 2A shows a first configuration with two processors configured as a single platform.

FIG. 2B shows a second configuration with two processors configured as two separate platforms.

DETAILED DESCRIPTION

A server computer can have multiple potential configurations depending on a state of an input signal. In a first potential configuration, a single-platform model is used with multiple processors booted using a single Basic Input/Output System (BIOS). The multiple processors can have a bus there between allowing processor-to-processor communication. In a second potential configuration, a multi-platform model is used with multiple processors booted using separate BIOS to operate as separate platforms. In this configuration, the bus between the processors is disabled so that the platforms operate autonomously. The hardware can be extended to support additional processors, such as 4, 8, etc. A failover mode also allows the hardware to detect a hardware error (e.g., bus error) and dynamically reconfigure the processors to use an alternative bus. With the failover, the addressing of the processors can be modified to reconfigure the server computer to compensate for the hardware error.

Figure 1:
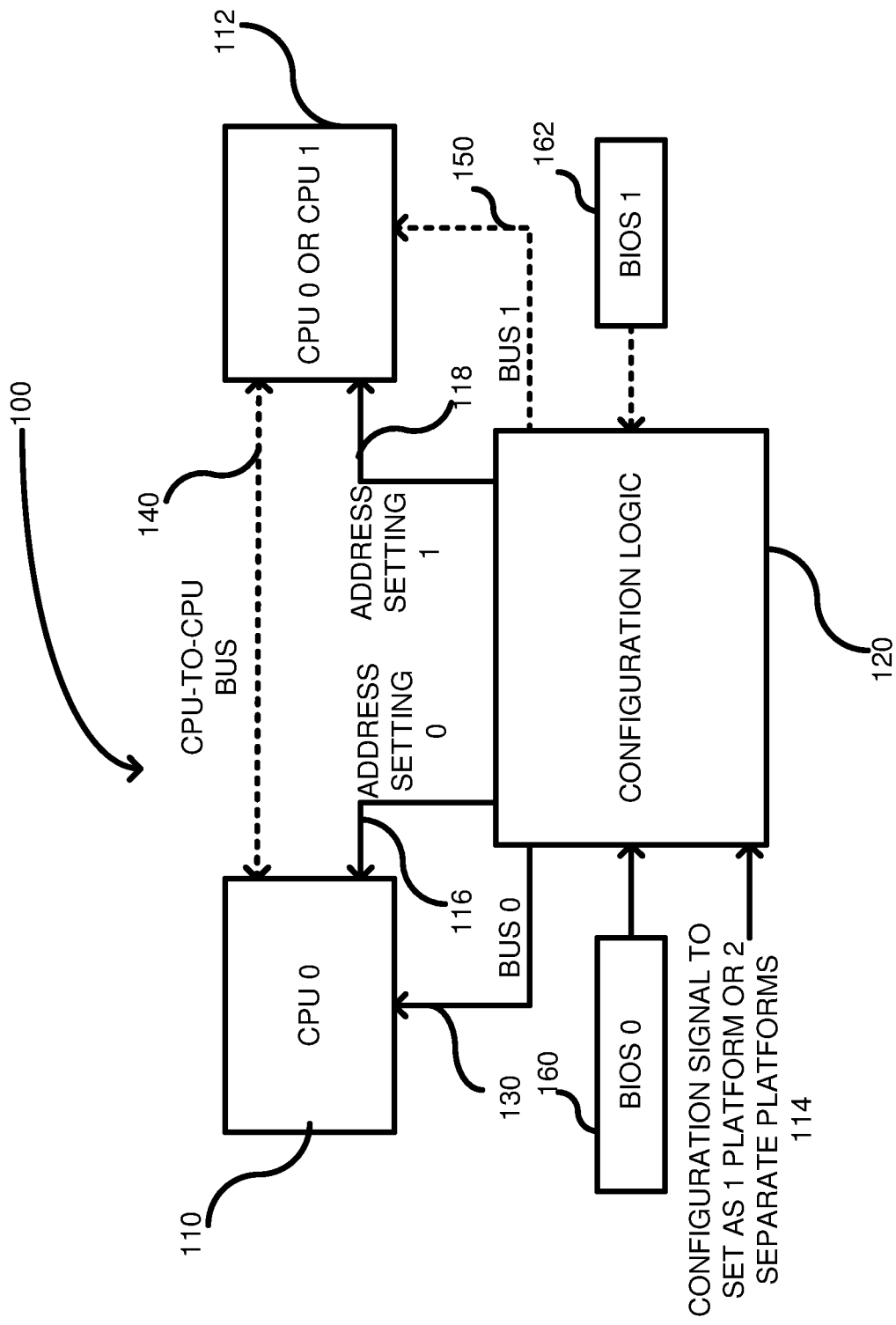
FIG. 1 is a first embodiment showing configuration logic used for configuring multiple processors in a server computer.

FIG. 1 is a first embodiment of a server computer 100 with multiple configuration alternatives based on an input signal received on an input port to configuration logic 120. In this particular embodiment, only two processors 110, 112 are shown and the server computer 100 can be configured as either a single platform or dual platforms based on a configuration signal 114. The separate platforms can be logically independent from each other, with each running a separate operating system having different memory maps, separate memory, etc. The processors can be a general-purpose central processing unit (CPU), processor in an application-specific integrated circuit (ASIC) or any other type of processor. The embodiments shown herein describe the processors as CPUs, but other processors can be used. In a single-platform configuration, processor 110 is set as CPU 0 and processor 112 is set as CPU 1 using address lines 116, 118, respectively, extending from configuration hardware logic 120. The single-platform mode has a bus 130 extending from the configuration logic 120 to the processor 110, which allows communication there between. The bus 130 can be a variety of bus types, such as a bus having multiple serial links with dedicated transmit and receive pins. An example bus type is a Direct Media Interface (DMI) bus manufactured by Intel® Corporation, but other bus types can be used. In the single-platform mode, a communication bus 140 is enabled to allow cross-communication between the processors 110, 112. As indicated by dashed lines, the communication bus 140 is configurable by the configuration logic 120 to be enabled or disabled depending on whether the system is in single-platform mode or multiple-platform mode. A BIOS 160 is input into the configuration logic 120 and is used to configure both processors 110, 112 in the single-platform mode. A second communication bus 150 between the configuration logic 120 and the processor 112 is disabled. Likewise, a second BIOS 162 is disabled in the single-platform mode. The single-platform mode configures the server computer as having a single memory map and a single operating system executing on the server computer.

The configuration signal 114 can also be set in the multi-platform mode wherein both BIOS 160, 162 are enabled and both buses 130, 150 are enabled. The configuration logic 120 can set the addresses 116, 118 so that both processors 110, 112 are at a same address (because two separate memory maps are used). Additionally, both processors 110, 112 are isolated from one another by disabling bus 140. Thus, the configuration hardware logic 120 receives the input signal 114, and, based on its state, determines how to configure the processors 110, 112 to set the processors in a single-platform mode or a multiple-platform mode. As described further below, additional processors can be added so that more than two platforms can be configured. The configuration logic 120 can be an Integrated Circuit (IC), such as a Field Programmable Gate Array (FPGA) or an ASIC.

FIG. 2A illustrates a single-platform model fully configured. The configuration signal 114 is set such that the configuration logic 120 interprets that the system is to be placed in a single-platform mode. As indicated, only BIOS 160 is used to configure both processors 110, 112. Additionally, the processors 110, 112 have different addresses as set by address lines 116, 118, so that both processors operate in a same memory map of the system. The bus 140 allows inter-processor communication so that the processors can cooperate in servicing the single platform.

FIG. 2B, by contrast, shows that the configuration signal 114 is set for a dual-platform model. As such, the configuration logic 120 has both processors 110, 112 set to a same address using the address lines 116, 118. The configuration logic 120 further disables bus 140 so that the platforms are isolated. The BIOS 160 is used to configure processor 110, while the BIOS 162 is used to configure processor 112. Both buses 130, 150 are enabled and can communicate with their respective processors 110, 112. Thus, two separate platforms are established, each with a single processor. The platforms can potential communicate together, but only through the configuration logic 120, as further described below.

Figure 3:
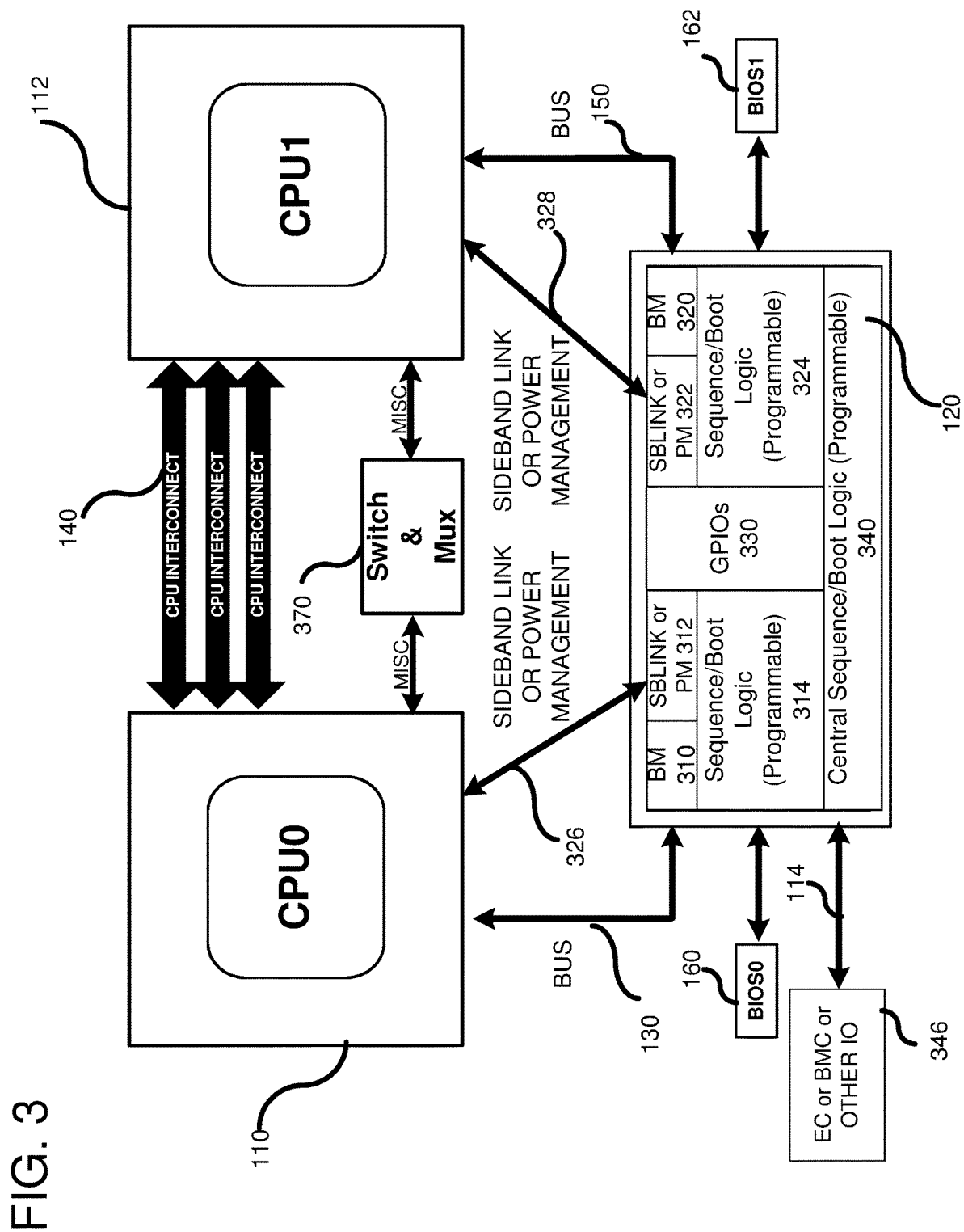
FIG. 3 shows further example details of the configuration logic used in conjunction with two processors.

FIG. 3 shows further details of the embodiments of FIGS. 1 and 2. The configuration logic 120 comprises separate parts for each processor 110, 112. In particular, for processor 110, the configuration logic 120 includes a bus manager 310, a side-band link and power manager 312, (which is a secondary communication bus) and a sequence/boot logic 314. Likewise, processor 112 includes a bus manager 320, a side-band link or power manager 322 and a sequence/boot logic 324. The bus managers 310, 320 monitor buses 130, 150, respectively, and provide logic for transmitting and receiving data over the buses 130, 150 using necessary protocols for communicating with processors 110, 112. The side-band link or power managers 312, 322 provide management for alternative communication channels 326, 328 with the processors 110, 112. Particularly, the side-band link or power managers 312, 322 can provide hardware logic for communicating with the processors 110, 112 using a predefined protocol. Power information or other desired performance data is typically passed through the sideband links 326, 328. The sequence/boot logic 314, 324 communicates with its respective BIOS 160, 162 and configures the processors 110, 112, after power-on or reset. The BIOS 160, 162 can be the same or different depending on the design. General purpose I/Os (GPIOs) 330 can be used to allow communication between the separate partitions when in a multiple-partition mode. A central sequence/boot logic 340 receives the input signal 114, which can be received from a variety of sources depending on the design. In particular, as shown at 346, the input signal can be from an embedded controller (EC) positioned on a motherboard of the server computer, or a baseboard management controller (BMC), or other I/O. Additionally, the input signal can be from a programmable logic device, such as an FPGA or CPLD. Based on the input signal 114, the central sequence boot logic 340 can control which buses are active and which configuration is applied. For example, the central sequence/boot logic 340 can configure switches and multiplexers 370, which can allow miscellaneous communication channels between the processors as well as enabling or disabling the communication channels 140.

Figure 4:
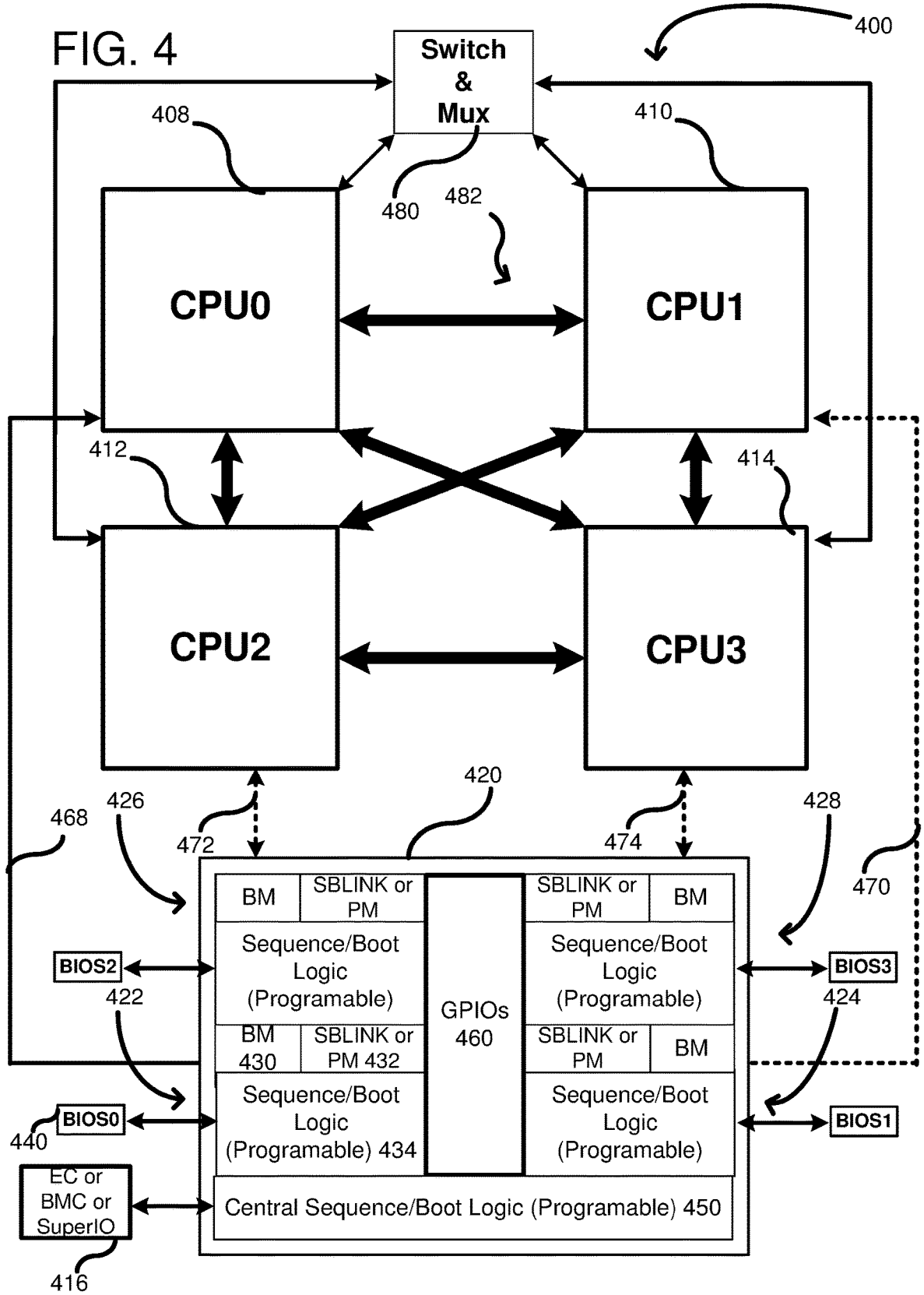
FIG. 4 shows an example of configuration logic used to configure four processors.

FIG. 4 illustrates another embodiment of a server computer 400, wherein four processors 408, 410, 412, 414 are dynamically configurable based on an input signal 416. A configurable hardware logic 420 includes four different sections 422, 424, 426, 428, one for each processor. Each section includes a bus monitor, a side-band link or power management module, and a sequence/boot logic. For example, a first section 422 includes a bus manager 430, a side-band link or power management 432, and a sequence/boot logic 434. The sequence boot logic 434 is coupled to a BIOSO 440 and is responsible for configuring the processor 408. If the input signal 416 places the server computer 400 in a single-partition mode, then the lines shown in dashed are disabled. As a result, the BIOSO 440 is used by the sequence/boot logic 434 to boot all of the processors 408, 410, 412, 414. The bus manager 430, the sblink or power manager 432, and the sequence/boot logic is similar to those described above and will not be repeated for purposes of brevity. The configuration logic 420 includes a central sequence/boot logic 450 that communicates with all of the sections 422, 424, 426, and 428 through GPIOs 460. When the input signal 416 indicates a single-partition mode, the central sequence/boot logic 450 instructs sections 424, 426, 428 to disable buses 470, 472, and 474, respectively. Accordingly, only bus 468 is active and is used to boot all of the processors 408, 410, 412, 414. The central sequence/boot logic 450 also controls switches and multiplexers 480 so as to enable buses shown, generally, at 482 to allow cross-communication between the processors.

If the input signal 416 indicates a multiple-partition mode, the processors 408, 410, 412, 414 are separately configured by each section 422, 424, 426, and 428, respectively. Thus, the central sequence/boot logic 450 controls the switches and multiplexers 480 to disable the buses 482 between the processors to disable communication there between. Communication between the partitions is thereby restricted to communication between the sections 422, 424, 426, and 428 through the GPIOs 460.

Figure 5:
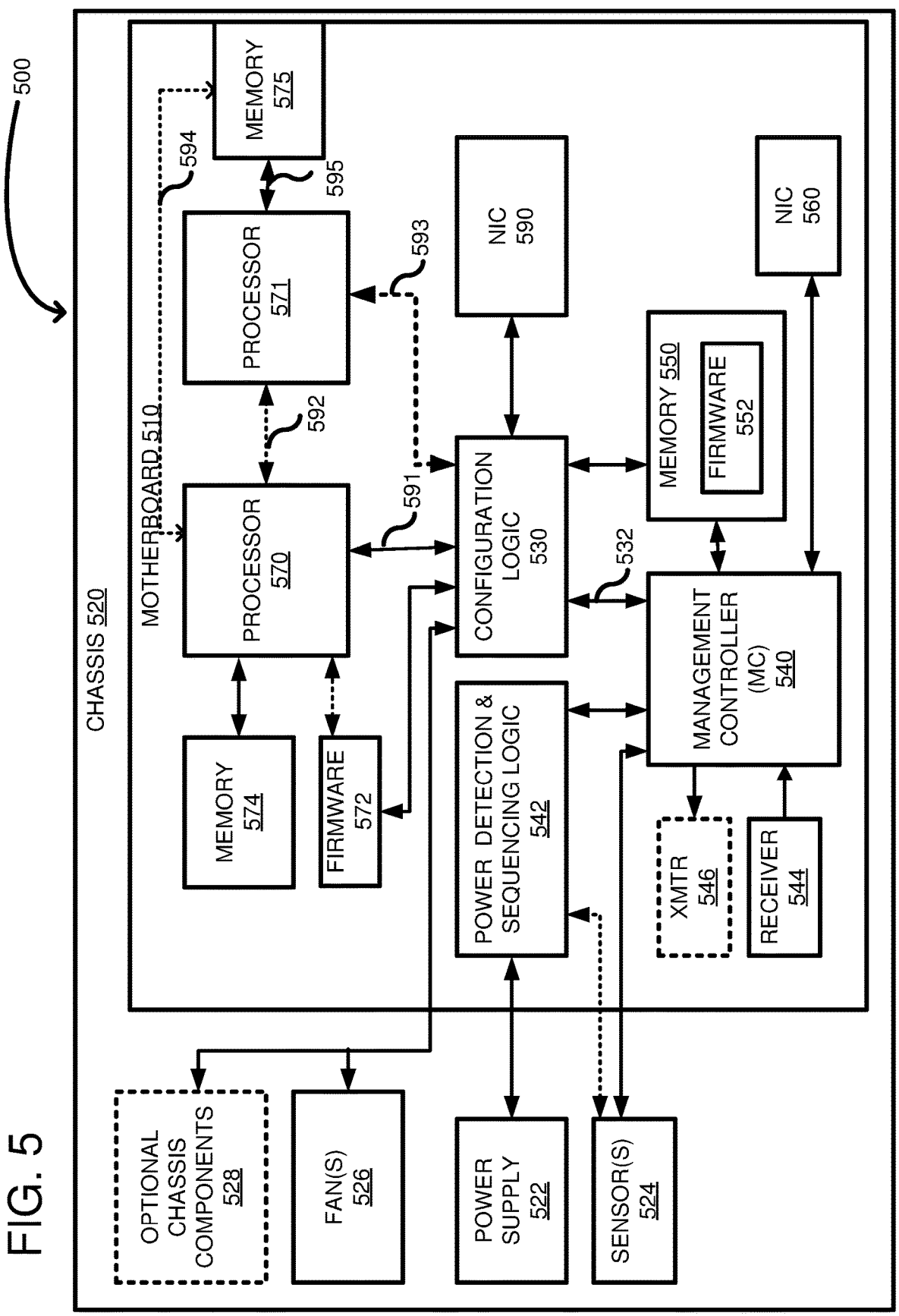
FIG. 5 shows the configuration logic on an example motherboard positioned within a server chassis.

FIG. 5 is a system diagram showing an example of a computing system 500 including a motherboard 510 and a chassis 520. The chassis 520 can include a power supply 522, one or more sensors 524, one or more fans 526, and optional chassis components 528. The motherboard 510 can include a set of components that are common across multiple computing systems so that the motherboard 510 can be used in multiple different computing systems. The motherboard 510 can be installed within the chassis 520. A configuration logic 530 can be used to configure the motherboard in accordance with an input signal 532 from a management controller 540, which can be a Baseboard Management Controller (BMC).

The computing system 500 can be connected to other components of a datacenter and power can be applied, such as by connecting the computing system 500 to an AC power source and/or toggling a power switch (not shown) of the chassis 520. The power supply 522 can convert energy from an alternating current to direct current energy that can be used to power the components of the chassis 520 and the motherboard 510. Power detection and sequencing logic 542 can be used to detect when the power supply outputs are within stable operating parameters. For example, after the power is initially switched on, it can take time for one or more of the power supply outputs to ramp to an appropriate output voltage. The power detection and sequencing logic 542 can sense the voltage of the power supply outputs and can indicate when the voltage is within operational parameters (such as within +/−10% of a predefined voltage). When a power supply output transitions to an operational state, the power detection and sequencing logic 542 can perform a power-up sequence and/or a reset sequence. For example, power can be applied to one portion of the motherboard before other portions of the motherboard. As another example, one portion of the motherboard can be placed in or taken out of reset at a different time than a different portion of the motherboard. As a specific example, a management controller 540 and its associated components can be brought out of reset (e.g., a reset signal connected to the management controller 540 can be de-asserted) before any processors (such as processors 570, 571). The power detection and sequencing logic 542 can further stagger power-up of the processors 570, 571. For example, in the multiple-platform mode, the processor 570 can be powered on and booted up prior to the processor 571.

The management controller 540 can be coupled to a receiver 544, which can receive an external input on how to configure the system 500. For example, during a power-on event sequence, the management controller 540 can activate a transmitter 546 which can be used to elicit a response describing how to perform configuration. The response can be received in the receiver 544, which can, in turn, cause the management controller 540 to start initialization of the system. For example, the management controller 540 can execute initialization software stored in memory 550. The initialization software can determine any programmable settings corresponding to the received signal. Alternatively, a Network Interface Card (NIC) 560 can be used to communicate with devices (such as server computers) connected to a management network, and such communications can control how the management controller 540 should initialize the system. Thus, configuration software modules can be downloaded from a server computer attached to the NIC 560. As another example, the configuration software can be read from a storage device (not shown) of the computing system 500 and loaded into the memory 550. Thus, there are multiple possible techniques that can be used to begin initialization of the management controller.

The retrieved configuration software can be stored in non-volatile memory that is directly or indirectly accessible by the management controller 540. For example, the configuration software can be software modules that are stored in firmware 552 and/or firmware 572. The firmware 552 and 572 can be used to control one or more components integrated with or controlled by the motherboard (such as components of the chassis 520). The firmware 572 can be used to program the configuration logic 530. For example, the configuration logic can be an FPGA and the hardware can be programmed therein after a reset. Once the configuration logic 530 is properly programmed, the management controller 540 can program the input signal 532 so as to configure the server computer 500 as a dual-platform system or a single-platform system, as was described above. The management controller 540 can receive instructions from the NIC 560 or the receiver 544 as to how to program the input signal 532. Alternatively, the management controller 540 can have non-volatile configuration instructions stored in the memory 550 that are available automatically upon start-up. The input signal 532 can be as simple as a single bit that is either set or cleared. Alternatively, multiple bits can be used. Nonetheless, using the input signal 532, the management controller 540 can control configuration of processors 570, 571 via the configuration logic 530.

The configuration logic 530 can be used to manage communications between the processors 570, 571 and other components of the motherboard 510 and the chassis 520. For example, the configuration logic 530 can include one or more bridges for converting between different signaling protocols. As a specific example, the processor 570 can communicate with the configuration logic 530 using a high-speed front-side bus and the NIC 590 can communicate with the configuration logic 530 using an input/output (IO) protocol, such as peripheral component interconnect (PCI), or PCI-Express. The configuration logic 530 can convert between and manage communications between the different protocols so that the processor 570 can communicate with the NIC 590 through the configuration logic 530. With Intel® processors, the configuration logic 530 can operate as one or more Platform Controller Hubs (PCH).

In the case wherein a single-platform mode is configured, the configuration logic 530 uses a bus 591 to configure or boot both processors 570, 571. In the single-platform mode, the cross-communication bus 592 is enabled by the configuration logic so that the processor 570 can act as a master in configuring processor 571. The buses 593 and 595 are disabled and bus 594 is enabled to couple the processor 570 to the memory 575. Thus, processor 570 has access to both memory 574 and 575, which can be configured as a single, contiguous memory. In the dual-platform mode, the buses 592, 594 are disabled and buses 593, 595 are enabled. The configuration logic 530 separately boots the processors 570, 571 using respective buses 591, 593. Each processor 570, 571 has its own memory 574, 575, respectively. As a result, both processors 570, 571 operate independently on separate platforms. Communication between the processors 570, 571 can occur through I/O registers within the configuration logic 530. Although only two processors are shown, the configuration can be extended to 4, 8, etc. processors similar to the description above. In the multiple-partition mode with 4 or 8 processors, the partitions can be divided in any desired way, such as 3 processors in one partition, and 1 processor in a second partition. Or, a 2-processor per partition configuration. The 8 processors can similarly be divided into partitions wherein a number of processors per partition is configurable.

Figure 6:
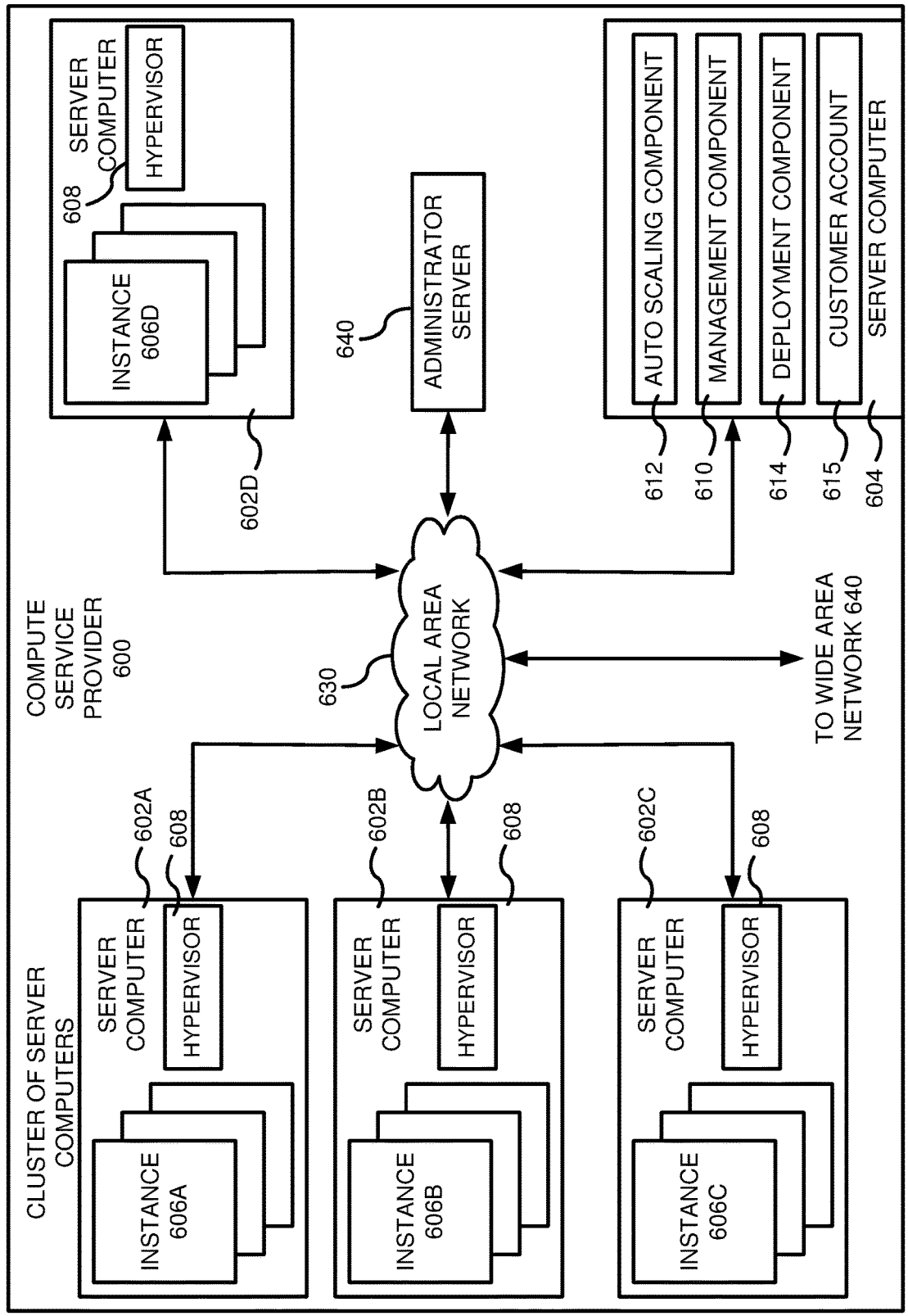
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can include configuration logic and multiple processors, as was described above and illustrated in FIG. 5, for example. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server.

Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

An administrative server computer 640 can be used to control a configuration of the server computers 602A-D. For example, the administrative server 640 can be coupled to the NIC 560 (FIG. 5) to signal to the MC 540 whether the processors 570, 571 are to be configured in single-partition mode or multiple-partition mode.

Figure 7:
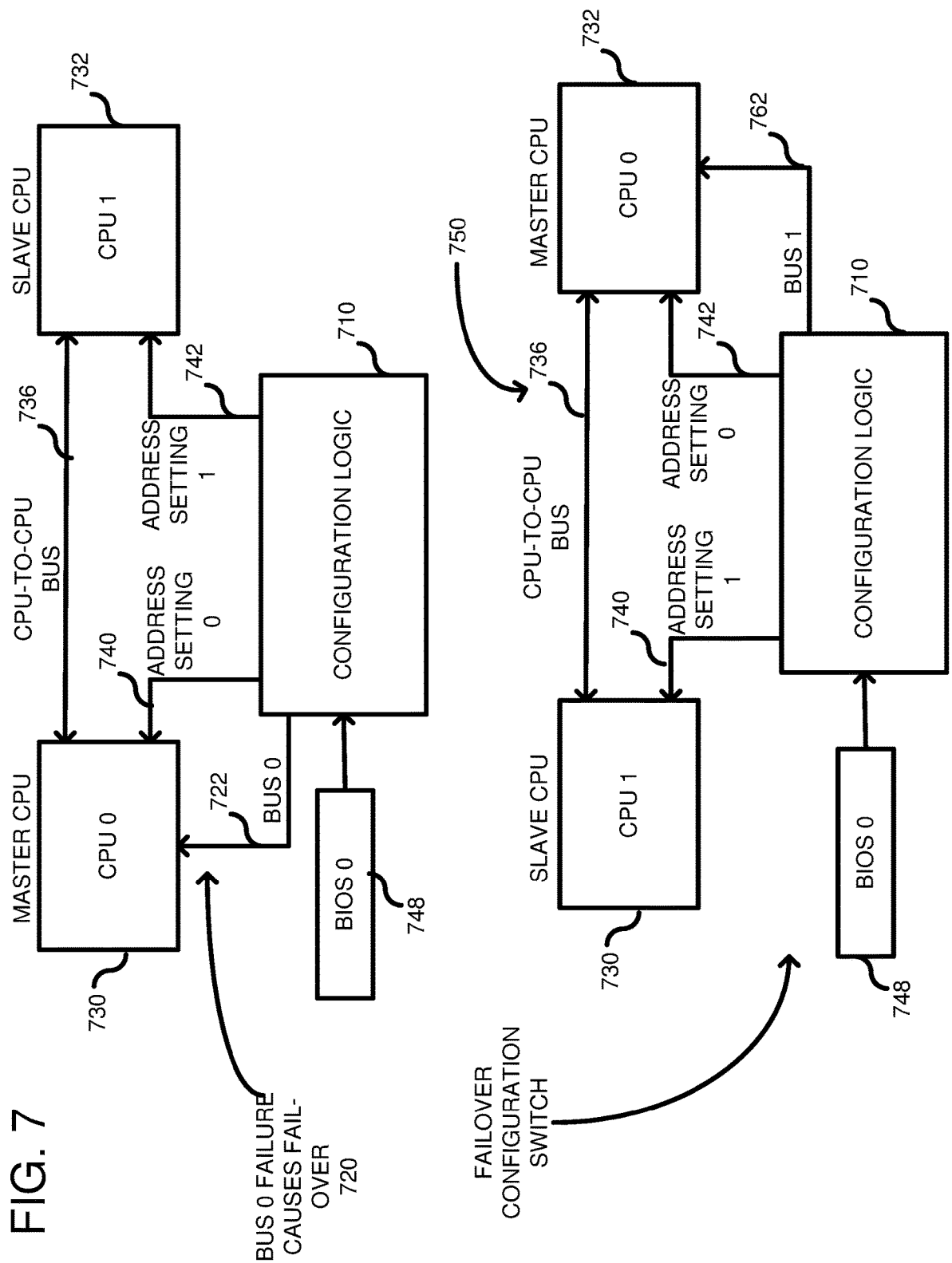
FIG. 7 illustrates an example a configuration swap due to a failover.

FIG. 7 shows a failover situation that can be implemented using configuration logic 710. As shown at 720, a bus 722 can become defective. In such a case, a bus manager hardware (similar to the bus manager 310 of FIG. 3), within the configuration logic 710, can detect that the bus 722 is not operational. The bus manager can report the error to the central sequence/boot logic (similar to logic 340 of FIG. 3) within the configuration logic 710, which can institute a failover. As shown, a processor 730 is considered a master processor, and a processor 732 is a slave processor coupled together via a bus 736. The configuration logic 710 uses address lines 740, 742 to set the address to the master processor 730 (designated CPU0) and the slave processor 732 (designated CPU 1). A single BIOS 748 can be used to configure both processors 730, 732. When the configuration logic 710 detects that the bus 722 has become defective, it initiates a failover in order to modify the configuration autonomously. The modified configuration is shown at 750. In response to the failover, the configuration logic 710 swaps the master/slave relationship by making the processor 732 the master and processor 730 the slave. In particular, the configuration logic 710 swaps the addresses on address lines 740, 742 so that the address previously on address line 740 is now on address line 742 and vice versa. Additionally, the failed bus 722 is disabled and a new bus 762 is enabled. Thus, the system is re-configured by swapping the processor roles, disabling the defective bus and enabling an alternative bus to allow the system to remain functional. The failover mode can also be applied to 4-processor or 8-processor server computers.

Figure 8:
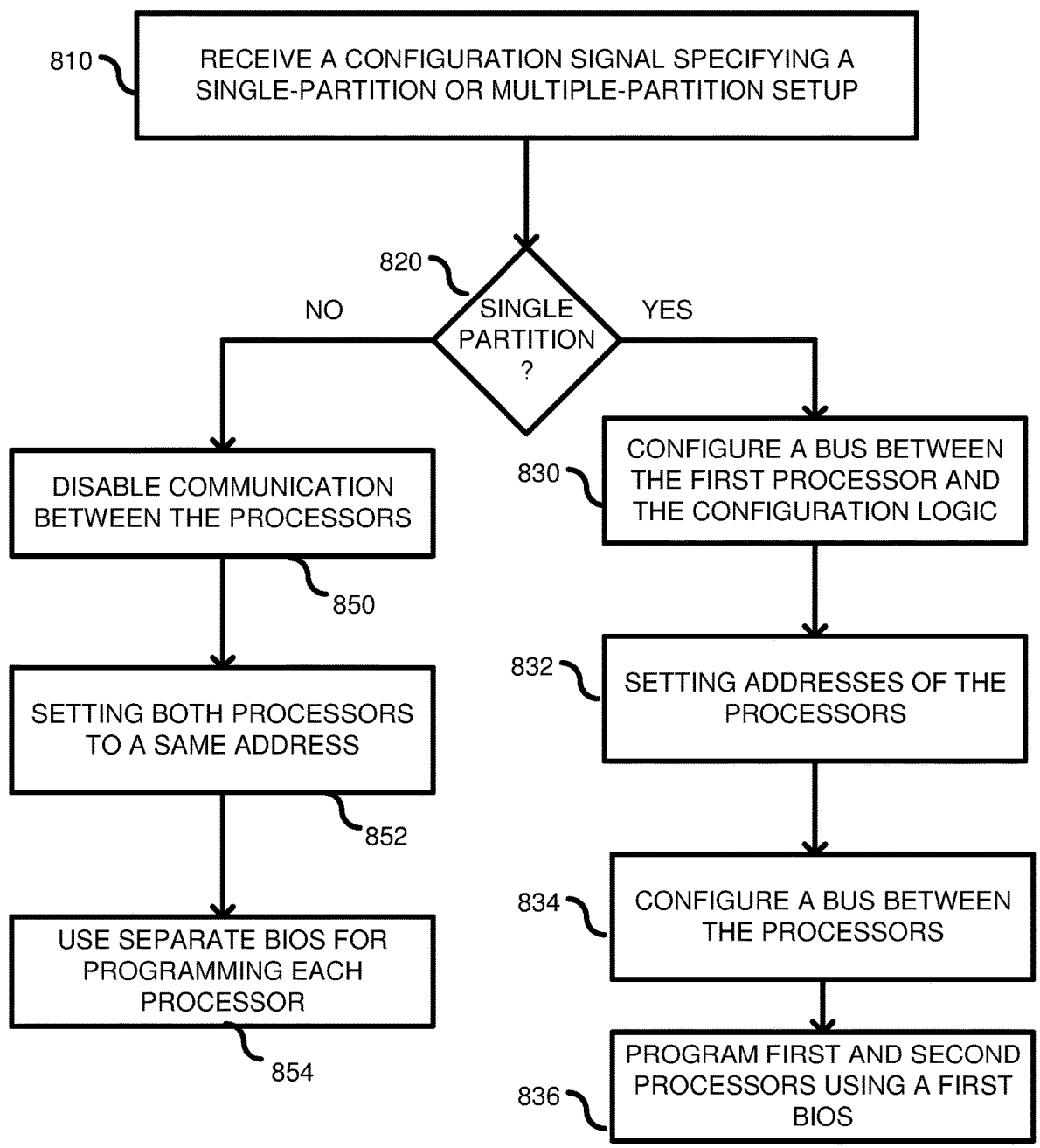
FIG. 8 is a flowchart according to one embodiment for configuring two or more processors.

FIG. 8 is a flowchart according to one embodiment for configuring one or more processors. In process block 810, a configuration signal is received that specifies whether a server computer is in a single-partition or multiple-partition setup. For example, in FIG. 1, a signal 114 is received by the configuration logic 120. The configuration signal 114 can be received from a variety of sources. For example, in FIG. 3 at 346, the configuration signal is from an embedded controller (EC), a BMC or other I/O. FIG. 5 shows a particular embodiment wherein a management controller 540 provides the configuration signal 532. Other sources can be used. In decision block 820, the configuration logic determines whether it is being directed to place the server computer in a single-partition setup. If answered in the affirmative, then in process block 830, the configuration logic configures a bus between one of the processors and the configuration logic. For example, in FIG. 2A, the bus 130 is enabled, while a bus 150 between the configuration logic 120 and the processor 112 is disabled. In process block 832, the addresses of the processors are programmed. More particularly, turning to FIG. 2A, the processors are set to different addresses because the processors are in a same memory map of the server computer. In process block 834, a bus is configured to couple the two processors so as to allow communication there between. For example, in FIG. 2A, the configuration logic 120 enables the bus 140 to allow interprocessor communication. In process block 836, the first and second processors are both programmed using a first BIOS. For example, in FIG. 2A, a BIOS 160 is used to configure both processors 110, 112. As part of the programming, addresses of the processors are set in process block 832.

When decision block 820 is answered in the negative, the configuration logic sets up the server computer in a multi-platform setup. In process block 850, communication between the processors is disabled. For example, in FIG. 2A, the bus 140 is disabled, which results in the bus being removed, as shown in FIG. 2B. In process block 852, both processors are set to a same address. For example, in FIG. 2B, both processors are set as CPU 0, and they are in separate partitions with separate memory maps. Thus, each processor can have a same address and not conflict with the other processor. Finally, in process block 854, separate BIOS are used to program each processor. For example, in FIG. 2B, BIOS 160 is used to program processor 110 and BIOS 162 is used to program processor 112.

Figure 9:
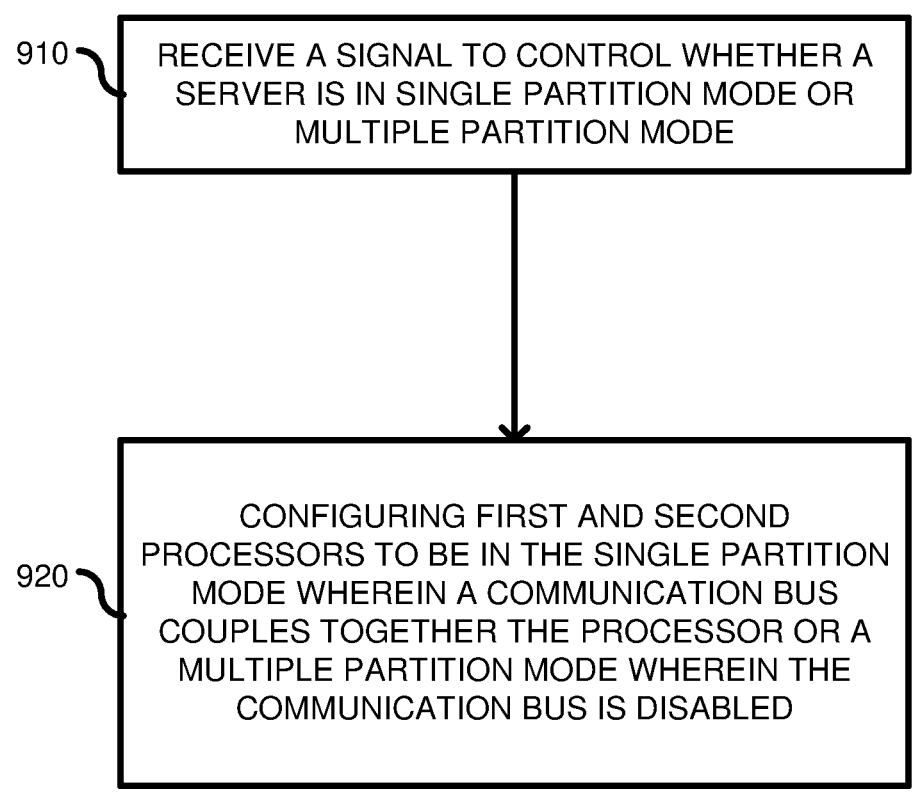
FIG. 9 is a flowchart according to another embodiment for configuring two or more processors.

FIG. 9 is another embodiment of a method for configuring a server computer. In process block 910, a signal is received to control whether the server computer is in a single-partition mode or a multiple-partition mode. For example, in FIG. 4, the input signal 416 can be received from a variety of sources, such as an EC, a BMC or other I/O, such as a signal received from a separate server computer. In process block 920, first and second processors can be configured in a single-partition mode or a multiple-partition mode. For example, in FIG. 2A, in a single-partition mode, the processors 110, 112, can be coupled together, such as by bus 140. However, in multiple-partition mode, the bus 140 is disabled, as shown in FIG. 2B, wherein the bus 140 is not shown. Similarly, in FIG. 4, the buses coupling together the four processors can be enabled or disabled.

Figure 10:
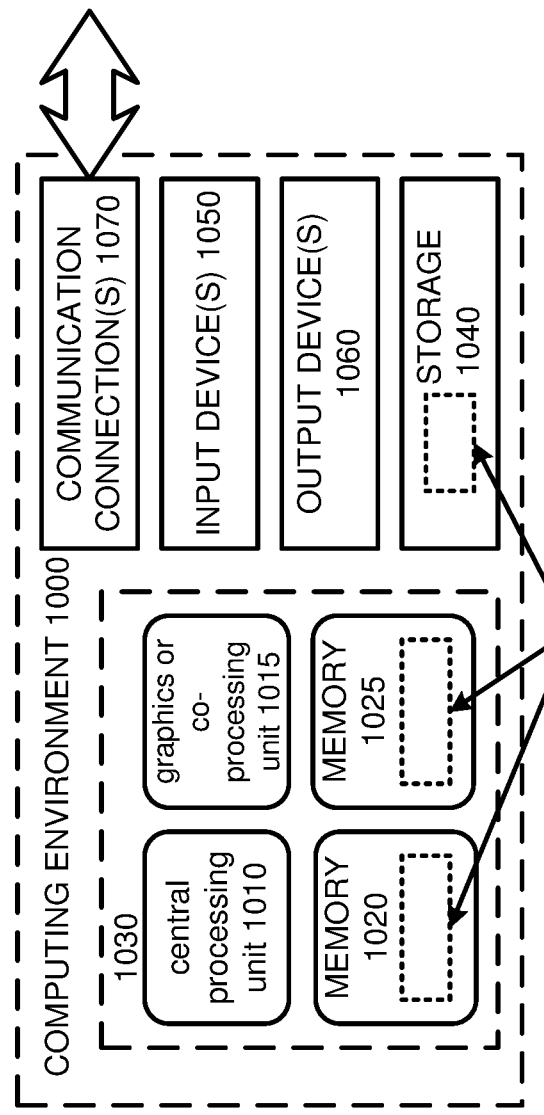
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). Although not shown, the configuration logic described herein can be used to configure processors 1010 and 1015.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of configuring first and second processors in a server computer, the method comprising:
   receiving a first configuration signal in configuration logic, the first configuration signal indicating that the server computer is to be configured in a single-partition;
   in response to the first configuration signal:
      setting a first processor to a first address and a second processor to a second address, different than the first address;
      configuring a first bus between the first and second processor so as to enable communication there between;
      configuring a second bus between the first processor and the configuration logic; and
      programming the first and second processors using a first BIOS;
   receiving a second configuration signal in the configuration logic, the second configuration signal indicating that the server computer is to be configured in a multiple partition setup;
   in response to the second configuration signal:
      setting the first processor to a first address and the second processor to the first address;
      configuring the first bus between the first and second processors to disable communication there between; and
      programming the first processor using the first BIOS and the second processor using a second BIOS.

2. The method of claim 1, further comprising, after receiving the first configuration signal:
   detecting that the second bus is defective;
   entering a failover mode and reconfiguring the single-partition to disable the second bus, and enable a third bus between the second processor and the configuration logic to replace the second bus.

3. The method of claim 2, further including swapping the first address and the second address so as to change the addressing of the first and second processors.

4. The method of claim 1, wherein the configuration logic is in a single Integrated Circuit (IC).

5. The method of claim 1, wherein the configuration logic includes general purpose IOs for allowing communication between partitions in the multiple-partition mode.

6. A method, comprising:
   receiving, in configuration logic, a signal indicating whether a server computer is to be configured in a single-partition mode or a multiple-partition mode; and
   based on the signal, configuring, using the configuration logic, at least first and second processors to either be in a single-partition mode, wherein the first and second processors are coupled together using a first communication bus, or a multiple-partition mode wherein the first communication bus is disabled between the first and second processors.

7. The method of claim 6, further including configuring, in the single-partition mode, the first processor to have a first address and the second processor to have a second address, different than the first address.

8. The method of claim 6, further including, in the single-partition mode, coupling a second communication bus between the configuration logic and the first processor, and disabling a third communication bus between the configuration logic and the second processor.

9. The method of claim 6, further including, in the multiple-partition mode, coupling a second communication bus between the configuration logic and the first processor, coupling a third communication bus between the configuration logic and the second processor.

10. The method of claim 9, further including communicating between the multiple partitions through registers in the configuration logic.

11. The method of claim 6, further including, in the multiple-partition mode, configuring the first processor to have a first address and the second processor to have the first address.

12. The method of claim 6, further including detecting, in the single-partition mode, that a second communication bus between the configuration logic and the first processor is malfunctioning and switching to a failover mode, wherein the configuration logic re-configures the first and second processors so as to establish a third communication bus between the configuration logic and the second processor, while disabling the second communication bus.

13. The method of claim 6, further including configuring third and fourth processors in either the single-partition mode or the multiple-partition mode, wherein in the multiple-partition mode, each processor is associated with a different partition.

14. The method of claim 6, wherein the signal is provided by an embedded controller or a Base Management Controller (BMC) that determines how to configure the server computer.

15. A server computer, comprising:
a first processor;
a second processor; and
configuration hardware logic couplable to the first and second processors based on an adaptable configuration of the server computer, the configuration hardware logic having an input signal port to receive an input signal, wherein the configuration hardware logic is configured to place the server computer in a single-partition mode of operation or a multiple-partition mode of operation based on the input signal and wherein the configuration hardware logic is a single Field Programmable Gate Array (FPGA).

16. The server computer of claim 15, wherein in the single-partition mode, the configuration hardware logic couples together the first and second processors via a communication bus to allow communication between the first and second processors.

17. An apparatus, comprising:
configuration logic including programmable hardware for placing processors of a server computer in a single-partition mode or a multiple-partition mode, wherein the configuration logic includes a central sequence/boot logic that reads an input signal and places the server computer in the single-partition mode or the multiple-partition mode based on the input signal;
wherein the configuration logic includes registers for allowing partitions coupled to the configuration logic to communicate there between in the multiple-partition mode.

18. The apparatus of claim 17, wherein the configuration logic includes side-band link logic to couple the configuration logic to one of the processors using a first bus, and bus manager logic to couple the configuration logic to another of the processors using a second bus.

19. The apparatus of claim 17, wherein the configuration logic includes boot logic for receiving a BIOS and for configuring one of the processors using the BIOS.

* * * * *